April 4, 1961 E. L. SCHIAVONE 2,978,610

IMAGE PRODUCING DEVICE

Filed Dec. 4, 1957

INVENTOR

Edward L. Schiavone

BY Watson, Cole, Grindle & Watson

ATTORNEYS 2,978,610

IMAGE PRODUCING DEVICE

Edward L. Schiavone, 8314 Carey Lane, Silver Spring, Md., assignor of one-half to Arthur G. Previn, Washington, D.C.

Filed Dec. 4, 1957, Ser. No. 700,639

13 Claims. (Cl. 315—169)

This invention relates to electronic devices and more particularly to electronic devices for translation of electrical signals into information images.

Priorly, numerous systems have been employed to produce visible images in response to electrical signals. The objects of recent developments in this field are to simplify the circuitry and to provide a viewing screen which is substantially flat. For example, Piper Patent 2,698,915 issued January 4, 1955, discloses a flat viewing screen which has two layers of conductors with a layer of phosphor between them. The scanning system employed in the Piper patent includes a rotary switch to establish sequential direct electrical connection between one terminal of a source of voltage and each of the conductors in one layer. The scanning system also includes a rotary switch which sequentially connects the conductors of the other layer to the other terminal of the source of voltage.

Also priorly, gas cells of various forms have been employed in the path of radio frequency radiated energy as variable impedance devices. Examples of these cells are found in V. K. Zworykin Patents 2,085,406 and 2,159,937; E. G. Linder Patents 2,047,929 and 2,047,930; I. Wolff Patent 2,064,582; G. C. Southworth et al. Patent 2,106,770, and L. Goldstein et al. Patent 2,557,961.

I have discovered that certain physical concepts disclosed in the above mentioned patents, as well as other concepts, may be combined in a novel apparatus for producing visible images in response to electrical signals.

Accordingly, it is an object of this invention to provide an improved image producing apparatus.

It is another object of this invention to provide an improved image producing screen.

It is still another object of this invention to provide an image producing apparatus with an improved scanning system.

It is still another object of this invention to provide a scanning system with an improved switching device.

Briefly, in accordance with aspects of this invention, a flat type phosphor viewing screen is provided with two groups of parallel transparent conductors, each of the conductors having a relatively large cross-sectional area exposed at one edge of the screen. The cross-section of each conductor of one of the groups is exposed at the same edge, for example, the top edge. The cross-section of each conductor of the other group is exposed at another edge which is perdendicular to the first edge, for example, the left side. Radiators of electrical energy are positioned adjacent each of the above mentioned screen edges. Gaseous cells are positioned between the radiators and each of the respective screen edges.

These gas cells include electrodes connected to a source of voltage which controls the ionization of the enclosed gases in accordance with the applied frequencies. Advantageously, these cells are shaped in the form of a prism and are positioned in such a manner between the electrical radiators and the edges of the viewing screen to cause the radiated waves to sequentially sweep across the exposed areas of the viewing screen conductors.

Also advantageously, these cells are positioned adjacent the edges of the screen so the axis of the cells subtends an acute angle with the vertical bisector of the screen edge. Thus the cells cause the radiated field to be bent a greater degree in response to greater ionization of the gas, the waves being incident upon the edge of one of the conductors at a time. Functionally, the gas cells act as sequential switches selectively to control the application of the R.F. waves to the edges of the conductors.

Advantageously, each of the conductors in one of the groups is connected through a resistor to a point of reference potential. Also, each of the conductors in the other of the groups is connected through another resistor to a point of reference potential. When the radiated wave from one of the radiators impinges upon the exposed end of one of these conductors in one of the groups, a current is induced in the conductor. This current follows the conductor to the resistor and a voltage is developed across the resistor. Simultaneously, the radiated wave from the other radiator impinges on the exposed end of one of the conductors in the other of the groups. In response to the current induced in the conductor of the other group a voltage is similarly developed across the resistor connected to that conductor. Since these groups of conductors are oriented at right angles to each other, an intersection will be defined between one of the conductors in one group and one of the conductors in the other group. In response to a signal applied to these two conductors, the layer of phosphor material located at this intersection will be subjected to two alternating current voltages, namely, those developed across the previously mentioned resistors. If the combination of these two voltages is equal to or greater than the threshold voltage of the phosphor, then the phosphor will emit light. The intensity of the emitted light is exponentially proportional with these combined voltages. Accordingly, if the beams of radiated waves which are radiated by the two radiators are modulated with a video signal, these beams are scanned over the conductors; the resultant voltages on the various combinations of conductors will result in excitation of the phosphor in accordance with the video signal such that a video image will be produced.

Advantageously, these principles of switching a radiated electrical wave in response to a signal applied to a prismatic gas cell may be employed in other devices where it is desired to sweep a narrow beam of radiated electrical wave energy across a number of conductors in the same plane. In accordance with the broad principles of this invention it is merely necessary to orient the gas filled prism at an angle with respect to the plane containing the conductors and to selectively control the ionization of the gas contained in the cell by the application of a suitable ionizing signal, such that the ionization varies in a substantial linear relationship to produce a linear sweep.

It is, of course, within the scope of this invention to employ suitable D.C. biases on the electrodes of the gas cells as well as upon the conductors of the screen. By the use of these biases, the levels of the signal and control voltages required are reduced to a minimum. The required control voltage, therefore, is merely that voltage required to be superimposed on the D.C. biases to exceed the breakdown potential in the instance of the gas cells and the required signal voltage to exceed the threshold voltage in the instance of the phosphor layer.

A suitable shield of conducting material, such as copper having a longitudinal slit therein, may be positioned between the prism and the conductors to restrict the radiated wave to the area including the ends of the conductors, since it is merely necessary for the waves to impinge upon a small area of the conductor to induce a current in the conductor.

Accordingly, it is a feature of this invention to provide a phosphor viewing screen with conductors having a substantial cross-sectional area and to employ a radiator of electrical wave energy selectively to energize the conductors in the screen for the purpose of producing a visible image at the intersection of certain of the conductors in the viewing screen.

It is another feature of this invention to employ a gas containing prism between a radiator of electrical energy and a plurality of conductors located in a single plane and to selectively control the degree of ionization of the gas in the prism to cause the beam of electrical energy selectively to impinge upon the conductors.

It is another feature of this invention to apply an electrical wave modulated at a video frequency to a radiator positioned adjacent a gas filled prism on another side of which prism is positioned a plurality of parallel conductors and to apply a variable ionizing potential to the gas in the prism to cause the radiated video modulated signal to sequentially impinge upon the conductors.

It is another feature of this invention to employ a radiator, a gas-filled prism, and a plurality of conductors positioned such that the prism is located between the radiator and the conductors and to position the prism such that its axis subtends an acute angle with the plane containing the conductors, so that a variable ionizing voltage applied to the gas filled prism will cause the radiated electrical signal to selectively impinge upon the conductors.

It is another feature of this invention to employ a phosphor screen having layers of parallel conductors, the conductors in one layer defining a substantial right angle with the conductors of the other layer, and to connect individual resistors between each of the conductors of one layer and a source of reference potential and to connect individual resistors between each of of the conductors of the other layer and a source of reference potential so that a voltage may be developed across one of the resistors of one of the groups of conductors in response to the application of an electrical wave impinging upon that conductor and a voltage will be developed across another resistor associated with the other group of conductors in response to a radiated electrical wave impinging upon an associated conductor in response to which combination of voltages the threshold potential of the phosphors located at the intersection of these two conductors will be exceeded and the phosphors will emit light at this interesection.

These and various other features of the invention will be understood more fully from the detailed description when read with the accompanying drawing in which—

Figures 1, 2, 3:
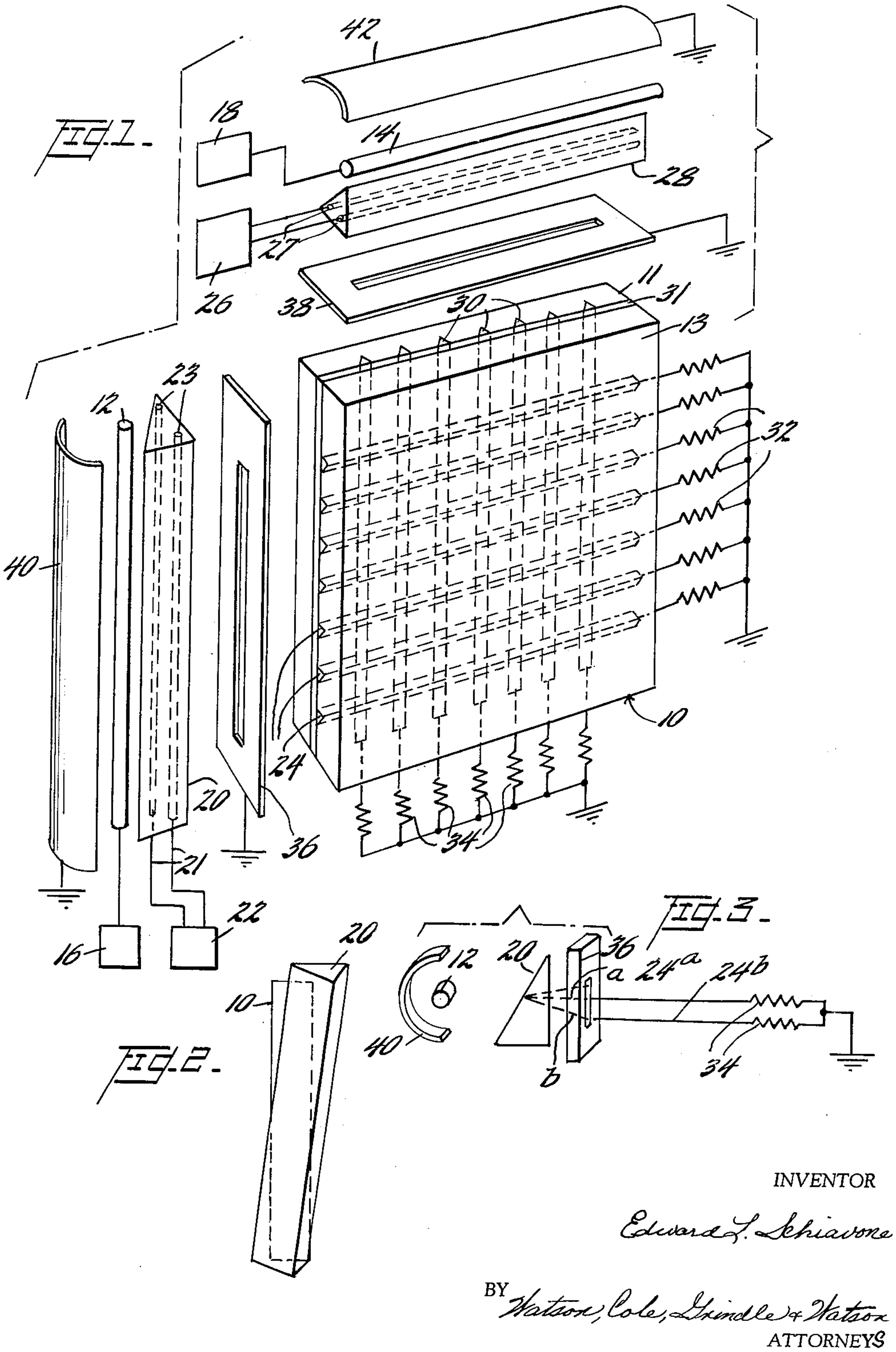
Figure 1 is a combined schematic and block representation, partly in perspective, of one illustrative embodiment of this invention.
Figure 2 is a view in elevation of one of the gas prisms and the image producing screens in accordance with this invention.
Figure 3 is a plan view of a portion of the embodiment of Figure 1.

Referring now to Figure 1, there is depicted a screen 10, radiators 12 and 14 associated with perpendicular edges of the screen 10, a pair of sources of modulated radio frequency energy 16 and 18 connected to radiators 12 and 14 respectively. Positioned between radiator 12 and the edge of screen 10 is a prismatic cell 20 containing an ionizable gas. A source 22 of voltage is connected to electrodes 21 and 23 within prism 20 for the purpose of selectively ionizing the gas in cell 20. These electrodes 21 and 23 may extend along the edges of the inside of the prism. It is understood that the required ionizing voltage is inversely related to the distance between these electrodes.

Screen 10 includes a pair of layers of plastic 11 and 13 with a layer of phosphor 31 sandwiched between them. Conductors 30 are located between layer 11 and phosphor layer 31 and extend in a vertical direction. Conductors 24 are located between plastic layer 13 and phosphor layer 31 and extend in a horizontal direction.

Advantageously, conductors 24 and 30 may be transparent over the major portion of their length while the ends adjacent the associated radiator need not be transparent and these ends may be of a relatively dense material, such as silver.

Similarly, a source 26 of voltage is connected to electrodes 27 and 29 in prismatic gas cell 28 which cell is positioned between radiator 14 and the top edge of screen 10. Source 26 applies a voltage to the electrodes within gas cell 28 to selectively ionize the gas in a manner similar to that employed with respect to prism 20, except that a different frequency of voltage is applied so that the radio frequency wave radiated from radiator 14 is selectively applied to the ends of conductors 30 at a different frequency from the scanning rate employed with respect to conductors 24. A layer of phosphor 31 is sandwiched between conductors 24 and 30 and this phosphor will emit visible light in a substantially exponential relationship with the applied voltage; that is, the voltage applied between a selected conductor 24 and a selected conductor 30. This phosphor may be of any convenient type well known in the art and may preferably be one of those having a relatively low required threshold voltage.

Each of the conductors 24 is connected through a suitable resistor 32 to a source of reference potential; similarly, each of conductors 30 is connected through a suitable resistor 34 to a source of reference potential. These resistors may conveniently be in the printed form between the plastic and phosphor layers, making only a single ground connection necessary for resistors 32 and 34. The purpose of these resistors is to develop a voltage between the several conductors 24 and the several conductors 30 in response to the incidence of a radio frequency wave upon these conductors, such that a combination of voltages between a selected conductor 30 and a selected conductor 24 will equal or exceed the threshold voltage of the phosphor located at the intersection of these two conductors. This combination of voltages will excite the phosphor at the intersection of the two selected conductors. If now the incident radio waves are selectively scanned in sequency over the ends of conductors 24 and 30 by means of gas prisms 20 and 28 which are selectively ionized by sources 22 and 26 respectively, then a pattern of visible light will appear on the phosphor layer. The brightness of portions of this pattern will be greater than that of other portions of the pattern due to the difference in the modulation of the radio frequency wave radiated from radiators 12 and 14, since this energy is modulated in accordance with a pre-determined electrical signal such as a video signal. While two sources of modulated radio frequency voltage 16 and 18 are shown connected to radiators 12 and 14, it is possible to connect both radiators 12 and 14 to a single source of modulated voltage.

The frequency of the waves emitted by the modulating sources 16 and 18 may advantageously be of the order of two to three thousand megacycles, or any convenient frequency such that the waves radiated from these radiators may be selectively bent by their passage through the prisms in response to the selective ionization of the gas in the prisms. As disclosed in Linder Patent 2,047,930, the radio frequency wave may be bent when passing through an ionized gas. If logarithmically varying current passes through the gas in prisms 20 and 28, the angle of deflection of the radiated waves will change linearly with time. For example, if 4½ mm. Hg of neon are contained in the prisms and the current is varied in accordance with a logarithmic rate, then the attenuation and the resulting deflection of the incident beam will vary linearly with time. If gas prisms 20 and 28 are positioned such that their axes subtend acute angles with the longitudinal axes of the edges of the screen 10, then the radiated waves will be selectively scanned over the ends of conductors 24 and 30 in response to the varying ionization of the gas.

Advantageously a pair of shields 36 and 38 of suitable conducting material, such as copper, may be positioned between the prisms 20 and 28 and the respective edges of screen 10. Each of these shields has a narrow slit longitudinally of the shield to permit the radiated wave to impinge upon a narrow region containing the ends of the respective conductors 24 and 30. These shields may be connected to a source of reference potential.

Advantageously, these conductors may have a substantial cross sectional area as best seen in Figure 1 and these cross sectional areas may be in any convenient form such as a circle, a semi-circle, or a triangle. These conductors may be imbedded or applied to the plastic layers 11 and 13 in any convenient manner well known in the art. Suitable reflectors 40 and 42 may be included in the apparatus to direct the radiated waves towards the edge of viewing screen 10 in a manner well known in the art. These reflectors may haxe extensions which extend substantially around the radiators 12 and 14, having only a narrow slit from which R.F. waves are radiated. With such an arrangement shields 36 and 38 might be eliminated.

The scanning operation will be understood from an understanding of the operation of the device as shown in Figure 4. When a radiated wave is emitted from radiator 12 it impinges upon gas filled prism 20 and the angles defined by the radio wave in passing through the gas filled cell 20 are determined by the degree of ionization of the gas. Thus, if the degree of ionization is relatively low, only a slight attenuated and incident bending occurs in the beam. For example, the beam would follow path A and would be incident upon the conductor 24A; however, as the degree of ionization increases due to the application of a greater voltage from source 22, the beam is deflected to a greater angle and follows a path such as path B and the beam will be incident upon conductor 24B. Thus it will be apparent that if the degree of ionization is caused to increase linearly, then the radiated wave will sequentially impinge upon the ends of conductor 24. A control pulse may be transmitted from source 22 to source 16 through a suitable connection, not shown, to turn off the radiated wave at the end of each scanning cycle.

Advantageously, with gas in the prisms, such as prisms 20 and 28, a suitable bias potential is maintained between the electrodes 27 and between the electrodes 23 which potential is sufficient to maintain the gas in a degree of partial ionization. It is, therefore, necessary to apply only a relatively small varying voltage which is superimposed on the bias to achieve the desired range of ionization. In a similar manner a D.C. bias may be applied across the resistors 32 and 34, such that only a small radio frequency signal is required to exceed the threshold potential of the phosphor.

It is thus apparent that the present invention embodies numerous novel concepts to provide a device for producing possible images in response to electrical signals and this device includes unique arrangements of radiators and conductors and the unique orientation of a gas filled prism between the radiator and conductors to selectively control the incidence of the radio frequency waves upon the ends of the conductors.

It is to be understood that electrodes 21 and 27 are represented schematically in the drawing and that one of each of these pairs of electrodes may cover one entire wall of the inside of the prism. Advantageously, this wall is that which is located parallel to the path of the radiated beam. This electrode configuration is for the purpose of insuring that the ionized region of the gas will be in the shape of a prism.

The above-mentioned concepts may be adapted to the production of a color image producing device. To achieve such an arrangement, it is merely necessary to divide the conductors one of the parallel groups into subordinate groups of three conductors and to employ different color emitting phosphors between each of the conductors of one of the sub groups and the conductors of the other group in the opposite plane. It is, of course, understood that such an arrangement would require that the conductors of the sub groups be scanned in accordance with the control signal associated with a color scanning system.

What I claim is:

1. A device for producing visible images in response to electrical signals comprising a screen having a pair of plastic members and layers of parallel conductors between said members, a layer of phosphor between the layers of conductors, means angularly positioned relative to the edges of said screen for radiating a narrow beam of energy toward two edges of said screen and selectively directing said beam to impinge upon the conductors of each of said groups and shield means between the edges of said screen and said radiating means and having a slot therein parallel to and adjacent said conductors.

2. A device in accordance with claim 1, wherein said radiating means includes a pair of radiators and a pair of gas cells, each gas cell positioned between a radiator and one of the edges of said screen, and further includes means for selectively controlling the degree of ionization of the gas in said cells.

3. A device in accordance with claim 2, wherein said gas cells are in the form of prisms.

4. A device in accordance with claim 3, wherein each of said gas cells is positioned so that the axis of the gas cell subtends an acute angle with the longitudinally axis of said screen.

5. A device in accordance with claim 1, including a plurality of resistors each connected between one of said conductors and a point of reference potential.

6. A device in accordance with claim 1, wherein said radiating means includes a pair of radiators each positioned adjacent one of the edges of said screen and further including means for applying a modulated radio-frequency signal to said radiator.

7. A device in accordance with claim 6, wherein each of said shield means is a conducting mask positioned between each of said prisms and the associated edge of said screen to confine the radiated electrical wave to a relatively narrow plane including the plane of said conductors.

8. A device in accordance with claim 5, wherein said resistors are printed on a portion of said screen connected to the ends of said conductors.

9. A device in accordance with claim 1, wherein a portion of each of said conductors is transparent.

10. A device in accordance with claim 1, wherein one end of each of said conductors is defined by a highly conductive material.

11. A device in accordance with claim 3, wherein the prisms are positioned with their axes rotated out of the plane of the associated layer of conductors and wherein the radiating means includes electrodes in said prisms extending along the edges of said prisms.

12. A device for selectively controlling the direction of radiation of an electrical signal comprising means including a radiator for radiating an electrical signal, conducting means for receiving said radiating signal comprising a plurality of conductors located in a substantially parallel plane, a gas filled prism positioned between said radiator and said conductors and disposed at an acute angle relative to the edge of said conductors, and means including a shield disposed between said prism and said conductors and having a slot therein, said slot being parallel to and adjacent said conductors, a source of variable voltage connected to said gas filled prism to selectively control the degree of ionization in said prism whereby the signals radiated from said radiator are selectively scanned over said conductors.

13. A device in accordance with claim 12, wherein said first mentioned means includes a source of modulated radio frequency energy connected to said radiator and wherein said source of variable voltage includes means for delivering a current through said gas prism which varies logarithmically with time.

References Cited in the file of this patent

UNITED STATES PATENTS

| | | |
|---|---|---|
| 2,047,930 | Linder | July 14, 1936 |
| 2,698,915 | Piper | Jan. 4, 1955 |